(12) United States Patent
Heinrich et al.

(10) Patent No.: US 11,074,199 B2
(45) Date of Patent: Jul. 27, 2021

(54) SECURING A MEMORY DEVICE

(71) Applicant: HEWLETT PACKARD ENTERPRISE DEVELOPMENT LP, Houston, TX (US)

(72) Inventors: David F. Heinrich, Houston, TX (US); Theodore F. Emerson, Houston, TX (US); Don A. Dykes, Houston, TX (US); Sukhamoy Som, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 15/774,463

(22) PCT Filed: Jan. 27, 2016

(86) PCT No.: PCT/US2016/015175
§ 371 (c)(1),
(2) Date: May 8, 2018

(87) PCT Pub. No.: WO2017/131671
PCT Pub. Date: Aug. 3, 2017

(65) Prior Publication Data
US 2018/0322069 A1    Nov. 8, 2018

(51) Int. Cl.
*G06F 12/14*    (2006.01)
*G06F 21/85*    (2013.01)
(Continued)

(52) U.S. Cl.
CPC ........ *G06F 12/1416* (2013.01); *G06F 3/0622* (2013.01); *G06F 3/0659* (2013.01);
(Continued)

(58) Field of Classification Search
CPC .. G06F 12/1416; G06F 3/0622; G06F 3/0659; G06F 3/0679; G06F 2212/1052;
(Continued)

(56) References Cited

U.S. PATENT DOCUMENTS

| 7,596,687 B2 | 9/2009 | Sultenfuss |
| 2002/0116632 A1 | 8/2002 | Itoh et al. |

(Continued)

FOREIGN PATENT DOCUMENTS

KR    101486987    1/2015

OTHER PUBLICATIONS

International Search Report & Written Opinion received in PCT Application No. PCT/US2016/015175, dated Oct. 12, 2016, 12 pages.

(Continued)

*Primary Examiner* — Kalpit Parikh
(74) *Attorney, Agent, or Firm* — International IP Law Group, PLLC

(57) ABSTRACT

Some examples described relate to securing a memory device of a computing system. For instance, a method may comprise comparing a command for the memory device to each command in a list of commands. The command is accepted when the command matches an authorized command in the list of commands. The accepted command is issued to the memory device.

15 Claims, 6 Drawing Sheets

(51) Int. Cl.
 *G06F 21/00* (2013.01)
 *G06F 12/02* (2006.01)
 *G06F 3/06* (2006.01)

(52) U.S. Cl.
 CPC ........ *G06F 3/0679* (2013.01); *G06F 12/0246* (2013.01); *G06F 21/00* (2013.01); *G06F 21/85* (2013.01); *G06F 2212/1052* (2013.01); *G06F 2212/7207* (2013.01); *G06F 2212/7209* (2013.01)

(58) Field of Classification Search
 CPC ..... G06F 2212/7207; G06F 2212/7209; G06F 21/00; G06F 21/85
 See application file for complete search history.

(56) References Cited

U.S. PATENT DOCUMENTS

| | | | |
|---|---|---|---|
| 2005/0076041 A1* | 4/2005 | Stakutis | G06F 16/16 |
| 2007/0156987 A1* | 7/2007 | Chen | G06F 12/1458 |
| | | | 711/163 |
| 2007/0180210 A1* | 8/2007 | Thibadeau | G06F 12/1458 |
| | | | 711/163 |
| 2009/0006795 A1 | 1/2009 | Bress et al. | |
| 2009/0169020 A1* | 7/2009 | Sakthikumar | G06F 21/57 |
| | | | 380/278 |
| 2009/0210584 A1* | 8/2009 | Carlson | G06F 11/0745 |
| | | | 710/36 |
| 2010/0077138 A1 | 3/2010 | Bauernfeind | |
| 2012/0246385 A1 | 9/2012 | Dhandapani et al. | |
| 2013/0179631 A1* | 7/2013 | Cepulis | G06Q 30/0631 |
| | | | 711/103 |
| 2014/0189197 A1 | 7/2014 | Krithivas | |
| 2014/0195799 A1 | 7/2014 | Erickson | |
| 2014/0297922 A1 | 10/2014 | Sarangdhar | |
| 2014/0317372 A1* | 10/2014 | Herrick | G06F 12/1458 |
| | | | 711/163 |

OTHER PUBLICATIONS

Robert Van Rooyen, "Retrofitting Embedded Devices to Enhance Security," Aug. 15, 2013, 11 pps., <http://www.summitscientificinc.com/docs/Barr%20Group%20-%20White%20Paper%20-%20Retrofitting%20Security%201.2.pdf>.

* cited by examiner

100

400

SECURING A MEMORY DEVICE

BACKGROUND

A flash read-only memory (ROM) device is a non-volatile, electrically erasable and reprogrammable memory chip used for mass storage and secondary storage of data, among other uses. The flash ROM device may store information that allows a computer system to operate. For example, a flash ROM device may be used to store the basic input/output system (BIOS) for a computer system, basic system configuration information, and other sensitive data.

DESCRIPTION OF THE DRAWINGS

The examples of the present techniques are better understood by referring to the following detailed description and the attached drawings, in which.

DETAILED DESCRIPTION

A flash read only memory (flash ROM) may be found in various devices such as servers, personal computers, digital cameras, flash drives, and other types of computing devices and systems. Rash ROM devices are generally used to store basic firmware (e.g., comprising machine-readable instructions) and configuration files. For example, a flash ROM device may store the basic input and output system used to boot an operating system (OS) of a computing device and provide other operating services after booting the OS, such as low level access to interfaces to other devices.

Accordingly, the sensitive nature of the data that may be stored in the flash ROM may make the computer system vulnerable to accidental corruption or intentional attack. For example, a problem during the updating of the BIOS in a flash ROM, such as a power failure during data transfer, may lead to the corruption of the data in the flash ROM. This may make the computer system non-functional. Other possible problems could be caused by programs issuing commands to a controller for the flash ROM that have illegitimate write commands, write commands for illegitimate address ranges, and the like. Further, commands from malicious code may attempt to insert code to allow remote access to the computer system and its data.

Flash ROM devices are often considered difficult to secure from user modification since there is no way for the device to discern between authorized and non-authorized accesses. Existing protection methods typically lock the device or region from any modifications, making it impossible for authorized and desired changes to occur. Flash ROM devices are often considered difficult to secure from user modification since the ability of trusted entities to modify desired regions of the memory may be desirable. Further, security features that may exist may not be standardized and thus, may be implemented differently by various vendors.

Examples described herein may provide protection to data in flash ROMs from unauthorized access, incorrect commands, or malicious attacks. The protection includes comparing commands and parameters issued for a flash ROM to a list of commands and command parameters that are allowed for the flash ROM. If a command is not allowed, or has an incorrect parameter, the command is discarded without being sent to the flash ROM. In one example, the list of allowable commands is stored in registers in an application specific integrated circuit (ASIC) that includes the flash ROM controller.

Although the examples below discuss the techniques relative to flash ROMs, the techniques are not limited to flash ROMs. It can be understood that the techniques may also be used to secure other memory devices, including, for example, random access memories, solid state drives, hard drives, and the like. In these examples, the list of commands and command comparison circuitry may reside, for example, in a memory controller, a drive controller, or other low level circuitry.

Figure 1A:
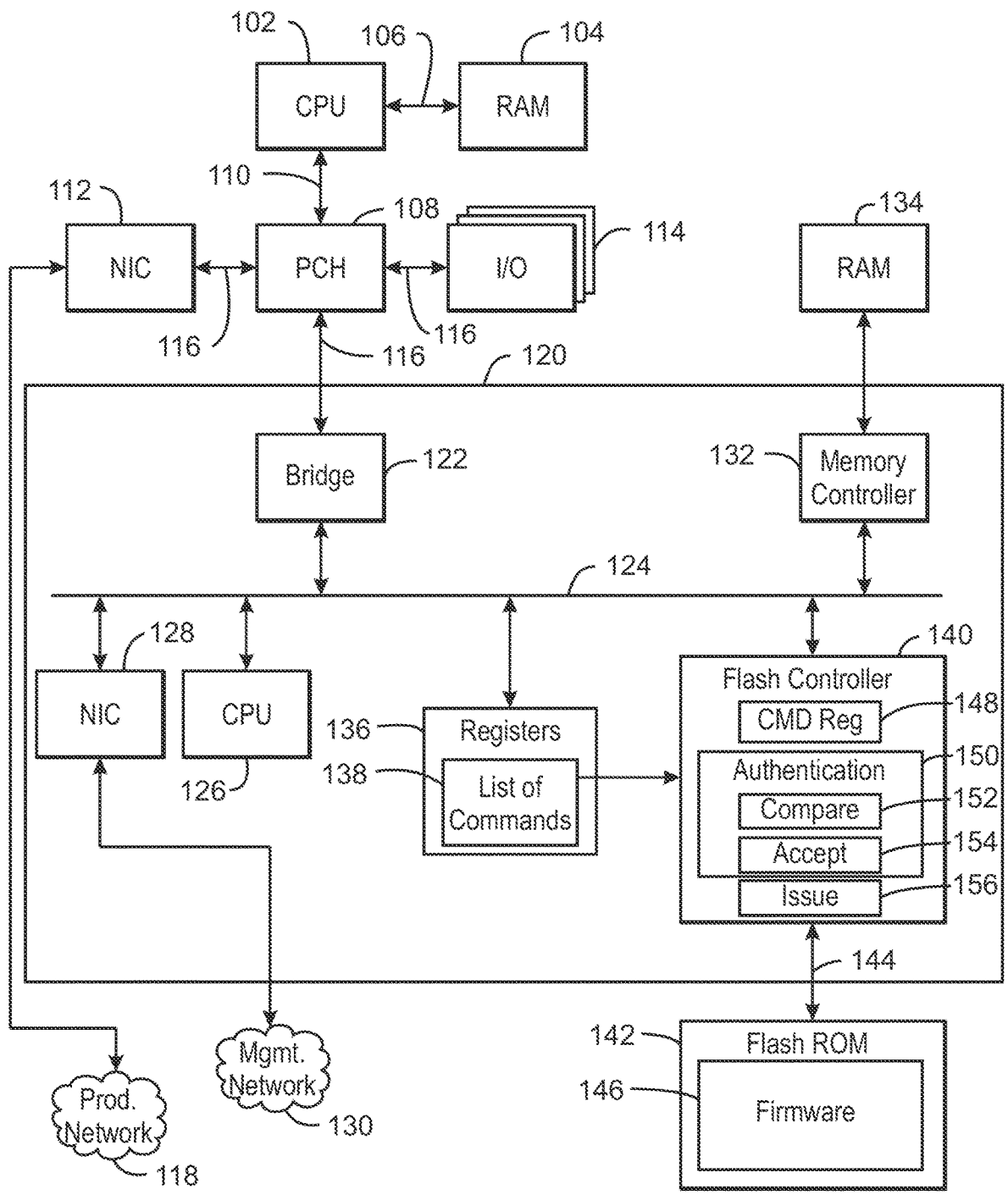
FIG. 1A is a block diagram of an example computing system in accordance with the present disclosure.

FIG. 1A is a block diagram of an example computing system 100 in accordance with the present disclosure. The computing system 100 may be a server, a personal computer, a tablet computer, a digital camera, a smartphone, or the like. The computing system 100 may include a central processing unit (CPU) 102. The CPU 102 can be a single core processor, a multicore processor, a processor cluster, or other types of CPUs. The CPU 102 may execute instructions stored in a memory device, such as a random access memory (RAM) device 104 connected to the CPU 102 via a RAM interface bus 106, such as double data rate 3 (DDR3), or DDR4 or the like. The RAM device 104 may be a dynamic random access memory (DRAM) device or a static random access memory (SRAM) device, among other memory devices.

The CPU 102 may be coupled to a platform controller hub (PCH) 108, Southbridge, or other controller hub, through an interconnect 110 that may vary based on CPU vendor and implementation specifics. Examples of the interconnect 110 can include proprietary interconnects such as the INTEL direct media interface (DMI), or through standard interconnects such as HyperTransport or Peripheral Component Interconnect Express (PCIe), among others.

The PCH 108 includes an integrated circuit, or a chipset, that manages the data flow between the CPU 102 and other internal or external hardware devices of the system 100. The PCH 108 may allow the CPU 102 to access a network interface controller (NIC) 112 and input/output (I/O) devices 114, for example, on any number of types of interconnects 116. Through the NIC 112, the CPU 102 may access a production network 118 for normal server and data functions, such as database access, providing data, and the like.

The PCH 108 may also couple the CPU 102 to circuitry that performs system management functions, such as a baseboard management controller (BMC) 120, through an interconnect 116. The interconnect 116 may include any number of interconnects over any number of widths. The BMC 120 may include an application specific integrated circuit (ASIC), a cluster of ASICs, a single board system, or any number of other configurations. In the example shown in FIG. 1, the BMC 120 is a single ASIC. The BMC 120 may provide a number of basic management utilities for the system, including proprietary functions in accordance with the integrated lights out KO) system available from Hewlett Packard (HP), and functions defined by other standards, such as intelligent platform management interface (IPMI), desktop and mobile architecture for system hardware (DASH) or alert standard format (ASF) platform management specifications, among others. In accordance with the standards, the BMC 120 can perform a range of system services such as monitoring physical variables of the computing system 100, for example, temperature, power-supply voltage, and operating system functions. Further, the BMC 120 may provide other management functions for the computing system 100 such as remote KVM (keyboard video mouse), virtual media, among others.

The BMC 120 may include a bridge 122 to couple to the interconnect 116 from the PCH 108. The bridge 122 may function as an interface between the interconnect 116 and an internal bus 124. The internal bus 124 may include any number of configurations, such a serial bus, a parallel bus, or high speed interconnects that couple different logic blocks, e.g., circuits on a single die or multiple dies, together.

The BMC 120 may include a BMC CPU 126. The BMC CPU 126 may execute code to support functions for the BMC 120. As an example, the BMC CPU 126 may be instructed to obtain and temporarily save an update for BIOS code to be implemented at a later time. The BMC CPU 126 may use a network interface controller (NIC) 128 in the BMC 120 to obtain the updated BIOS code from a management network 130. A memory controller 132 may be used to store the temporary copy of the BIOS code to RAM 134 that is coupled to the BMC 120.

Further, the BMC CPU 126 may be used to assist with the functions described in examples, herein, such as confirming that a command fits an authorized command template. In other examples, the comparison function may be performed by hard coded circuitry, for example, in a flash controller.

The BMC 120 may include registers 136 that may be used to store a list of commands 138. The list of commands 138 may include commands that a flash controller 140 is authorized to issue to a flash ROM 142 over a communications link, such as a Serial Peripheral Interface (SPI) 144. The SPI protocol is a high speed, four-wire, serial communications protocol that can be used to reduce on-board wire routing by replacing a traditional parallel bus with a serial interface and to simultaneously transfer data in both directions. It is to be understood that although the SPI bus is described in the present examples, other bus protocols can be used to operatively connect the BMC 120 and the flash ROM 142. For example, the commands may include a command type, such as a write, and parameter values, such as a chip select, a start address defining the beginning of a range of authorized addresses, an end address, defining the end of a range of authorized addresses. In this example, the flash ROM 142 holds the BIOS, or firmware 146, that is used to boot the computer system 100, and to provide low level interface code for some I/O devices 114.

The BMC 120 may operate in two modes. In a direct mode, initiated at power on, the CPU 102 performs a read cycle to an address in that corresponds to a memory range in the flash ROM 142. The flash controller 140 translates the read requests into commands, for example, SPI logic can convert the read cycle to a FAST READ SPI cycle to the flash ROM 142. During the booting process, the registers 136 may be loaded with the list of commands 138, for example, from the flash ROM 142. In some examples, the registers 136 may be preprogrammed with the list of commands 138. In other examples, the list of commands 138 may be hard coded into circuitry in the BMC 120.

Once the booting process is finished, the second mode for accessing the flash ROM 142 becomes possible. This mode, termed manual mode, allows commands to be sent to the flash controller 140, e.g., loaded to the command register 148, for accessing the flash ROM 142. In some examples described herein, a write protect bit in a control register in the BMC 120 may be set to indicate that commands in the command register 148 are to be checked against the list of commands 138 before the commands are issued to the flash ROM 142. This prevents accessing the flash ROM 142 using commands that are not on the list or with parameters that may cause problems, such as corruption of data or insertion of malware code into the firmware 146.

The CPU 102 may attempt to manually access memory addresses that are in the flash ROM 142, for example, by loading a write command and address range to the command register 148. Authorization circuitry 150 in the flash controller 140 may include a command comparator 152 that compares the command in the command register 148 to each of the authorized commands in the list of commands 138. If the command matches one of the authorized commands, including a correct address range and other parameters, a command acceptor 154 may pass the command to a command issuer 156, for example, an SPI controller, to be sent to the flash ROM 142. If the command in the command register 148 does not match any of the authorized commands, or includes incorrect parameters, the accept module may reject the command, for example, by returning an error to the CPU 102.

As an example, if the BMC CPU 126 were to attempt to update the flash ROM 142 with an update to the firmware 146, it may write data from a temporary copy of the firmware 146 stored in the RAM 134 associated with the BMC 120 to the flash ROM 142. However, if the write command has an incorrect or corrupted address, the firmware 146 may be overwritten with corrupted or invalid data. For example, if the address range is larger than the flash ROM 142 can store, or starts at a point that will not hold the data before running out of memory space, the outcome may be unpredictable. Comparing the command and the parameters to the list of commands 138 in the registers 136 may protect the contents of the flash ROM 142. Further, if a command has a valid address range, but is issued to a flash Rom 142 in an invalid manner, it may allow malicious software to access the flash Rom 142. This may be prevented by including the manner of the command issue in the list of parameters for the command.

The computer system 100 is not limited to the blocks or systems shown in FIG. 1. For example, any number of interface types may be used to access the flash ROM 142 instead of, or in addition to, the SPI protocol. Further, the techniques described herein may be implemented directly in a memory or disk controller, without using a BMC 120. For example, a command list may be implemented in a disk controller to protect certain regions of a hard drive from being overwritten. This may be used to protect operating systems, and the like.

The booting of the CPU 102 may occur in tandem with the booting of the BMC 120. For example, this may be performed to load the authorized command table. In one example, the BMC 120 boots from the flash ROM 142 in the same way the host does. The BMC CPU 126 issues bus cycles that are converted to SPI read commands and issued to the flash ROM 142 by the flash controller 140. After the BMC 120 boots, it then identifies the attached flash ROM 142 and additional devices. Then based on the type and manufacturer of the devices it populates the list of commands 138 in the registers 136. The BMC 120 then locks the table, so that the attached ROM devices may only accept acceptable commands from either the host CPU 102 or the BMC 120. After this is completed, the system 100 is allowed to boot, issuing code reads to the attached flash ROM 142 or ROMs using direct mode.

Figure 1B:
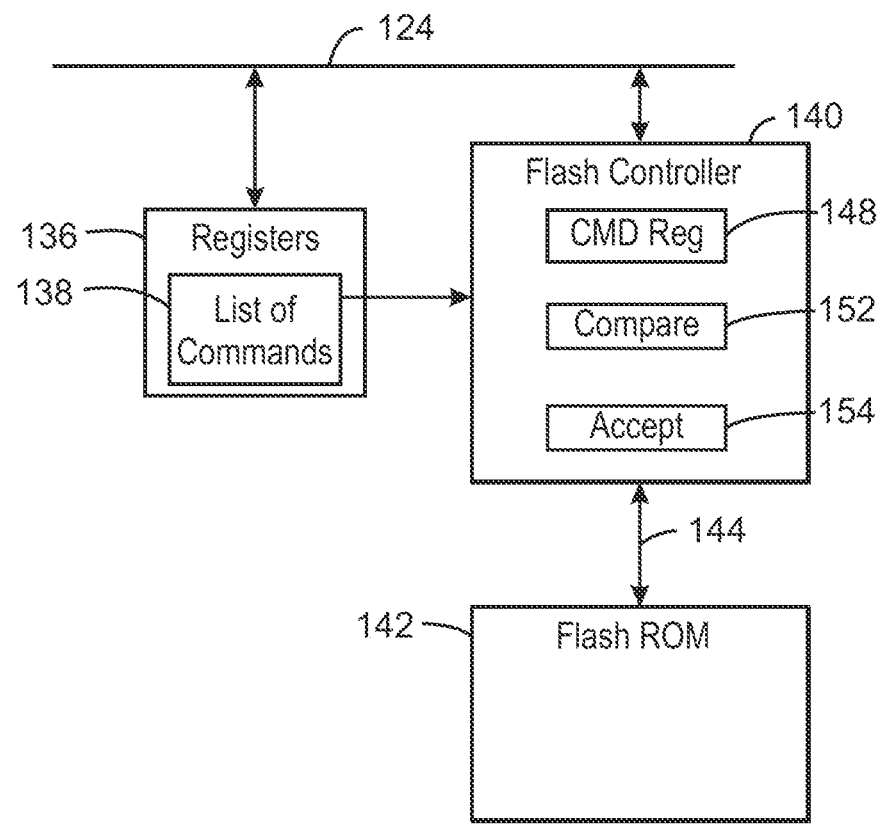
FIG. 1B is a block diagram of another example computing system in accordance with the present disclosure.

Not every block shown in FIG. 1A may be used in every example, as described with respect to FIG. 1B. Further, additional blocks, such as multiple flash ROMs, or other memory devices, may be used.

FIG. 1B is a block diagram of another example computing system 100 in accordance with the present disclosure. In this block diagram, the computing system 100 is simplified to clarify the blocks that may be used to perform the functions described herein.

Figure 2:
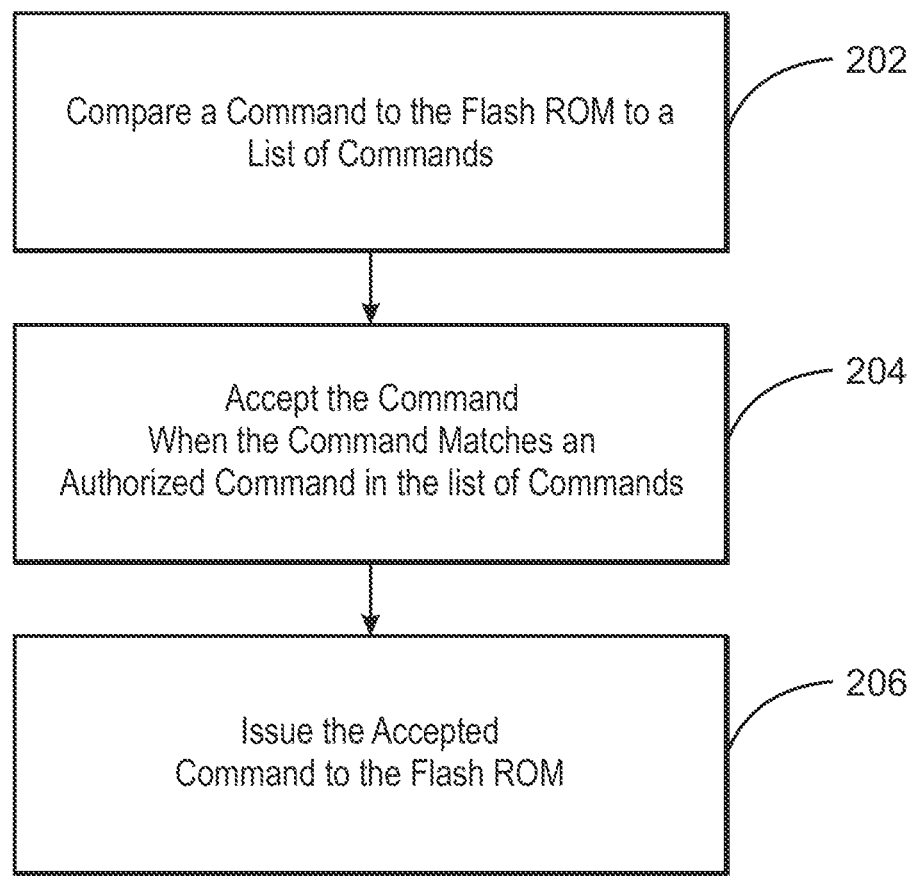
FIG. 2 is a process diagram of an example method for securing a flash memory device of the example computing system of FIG. 1 in accordance with the present disclosure.

FIG. 2 is a process diagram of an example method 200 for securing a flash memory device of the example computing system of FIG. 1 in accordance with the present disclosure. A list of commands may be located in registers of a flash controller, a memory controller, or a disk controller. In various examples, the commands may include about 20 commands, or about 32 commands, or more, depending on the system and the protection needed.

At block 202, the command in the command register is compared to the list of commands in the registers. An example of a simplified code segment that may perform the comparison is shown below. It can be understood that many more parameter comparisons may be performed than shown in the simplified code segment.

Command Allowed=Valid & ((Command==SPIAUTHCC.Command) && ((ChipSel==SPIAUTHCC.ChipSel) && SPIAUTHCQ.CSCmpEn) && ((DataDir==SPIAUTHCC.DataDir) && SPIAUTHCQ.DataDirEn) && ((DataWidth==SPIAUTHCC.DataWidth) && SPIAUTHCQ.DataWidthEn) && ((Addy>=SPIAUTHAS) && SPIAUTHCQ.AddrCmpEn) && (((Addr+Count)<=SPIAUTHAE) && SPIAUTHCQ.AddrCmpEn) && ((Count<SPIAUTHDC) && SPIAUTHCQ.CountCmpEn))

In the code segment, SPIAUTHCC is a pointer to the registers that hold the list of commands, while each of the terms after SPIAUTHCC indicate pointers to particular bit ranges in the registers that can hold the authorized commands and a list of authorized parameters that are associated with the command. Other pointers in the code segment point at other authorized attributes, including a pointer to a register including flags, SPIAUTHCQ, which indicate whether a particular parameter is to be compared. Additional pointers that may be used include SPIAUTHAS, which indicates an authorized starting address for the command, SPIAUTHAE, which indicates an authorized ending address for the command, and SPIAUTHDC, which indicates an authorized number of bytes or other data units, that may be used.

The first determination is whether the command itself is authorized, as determined by the comparison "Command==SPIAUTHCC.Command." If this is FALSE, e.g., indicating a non-authorized command, the rest of the associated parameters may be compared, as shown in succeeding lines, but the overall expression defaults to FALSE. If the first comparison is TRUE, the overall value for the expression is determined by the remaining comparisons, which determine if the parameters are authorized.

Each parameter comparison includes two elements, the parameter value comparison, and a parameter enable bit that indicates whether the comparison should be ignored. For example, "DataDir==SPIAUTHCC.DataDir) && SPIAUTHCQ.DataDirEn" is a comparison to determine whether the command is limited to a particular data direction, "DataDir." The second portion of the comparison, e.g., "SPIAUTHCQ.DataDirEn" is a pointer to a bit flag that determines whether the comparison will be performed, e.g., default to FALSE. Examples, of other comparisons that may be performed include chip select, "ChipSel", address ranges, "Addr", data counts, "Count", and many others not shown in this list. For example, the length of a command may be used to determine if the command is valid. This may block commands that have malicious sequences appended.

As an example, an ERASE BLOCK command or a READ Command may be sent to a command register for a flash ROM. The ERASE BLOCK command may delete data from the flash ROM and the READ command may retrieve data from the flash ROM. However, before the commands are issued to the flash ROM, the comparison is used to determine whether the transmitted commands are authorized.

For example, the ERASE BLOCK or READ command may be compared to the list of commands, for example, in registers. In this example, the ERASE BLOCK command may fail to match one of the commands in the list of commands. Thus, the ERASE BLOCK command may be rejected, and an error returned to the unit that attempted the command.

By comparison, the READ command may be on the list of commands, indicating that it is an authorized command. Further, the address range for the READ may match the parameters associated with the READ command in the registers. Accordingly, the READ command may be issued to the flash ROM, allowing the contents of the memory locations to be accessed and read back.

At block 204, if the transmitted command matches an authorized command, including the parameters, the command may be accepted and sent to the flash controller logic to be sent to the flash ROM. At block 206 the flash controller may issue the accepted command to the flash ROM, which implements the command, for example, providing the contents of a sequence of memory locations back to a CPU.

Figure 3:
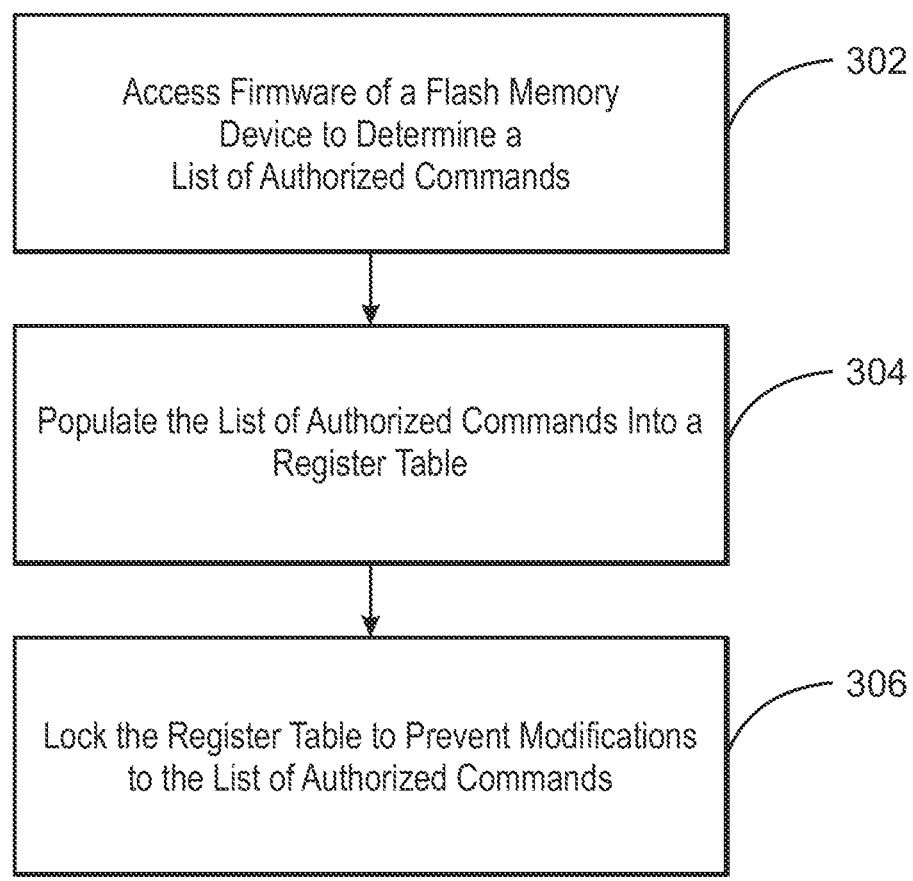
FIG. 3 is a process diagram of an example method for populating a register table located in a management controller of a computing system in accordance with the present disclosure.

FIG. 3 is a process diagram of an example method 300 for populating a register table located in a management controller of a computing system in accordance with the present disclosure. At block 302, during a boot sequence, a CPU may access the firmware to locate and read the list of commands. At block 304, the commands are written to registers, or other storage, in a BMC, memory controller, disk controller, or other unit. At block 306, the registers may be locked, for example, by setting a bit flag, to prevent modifications to the list of authorized commands. As described herein, the list of authorized commands may be preprogrammed into registers in a BMC, PROM, or other ASIC during manufacturing, preventing modification of the list of authorized commands. Similar benefits may be obtained by hard coding the list of authorized commands into logic blocks within a BMC or other ASIC, for example, as a design parameter implemented during fabrication of the ASIC. The bit flag may be set to enforce immutability of the data in the registers. For example, if the bit flag is set, modification of the registers may be prevented until after the management controller is reset.

Figure 4:
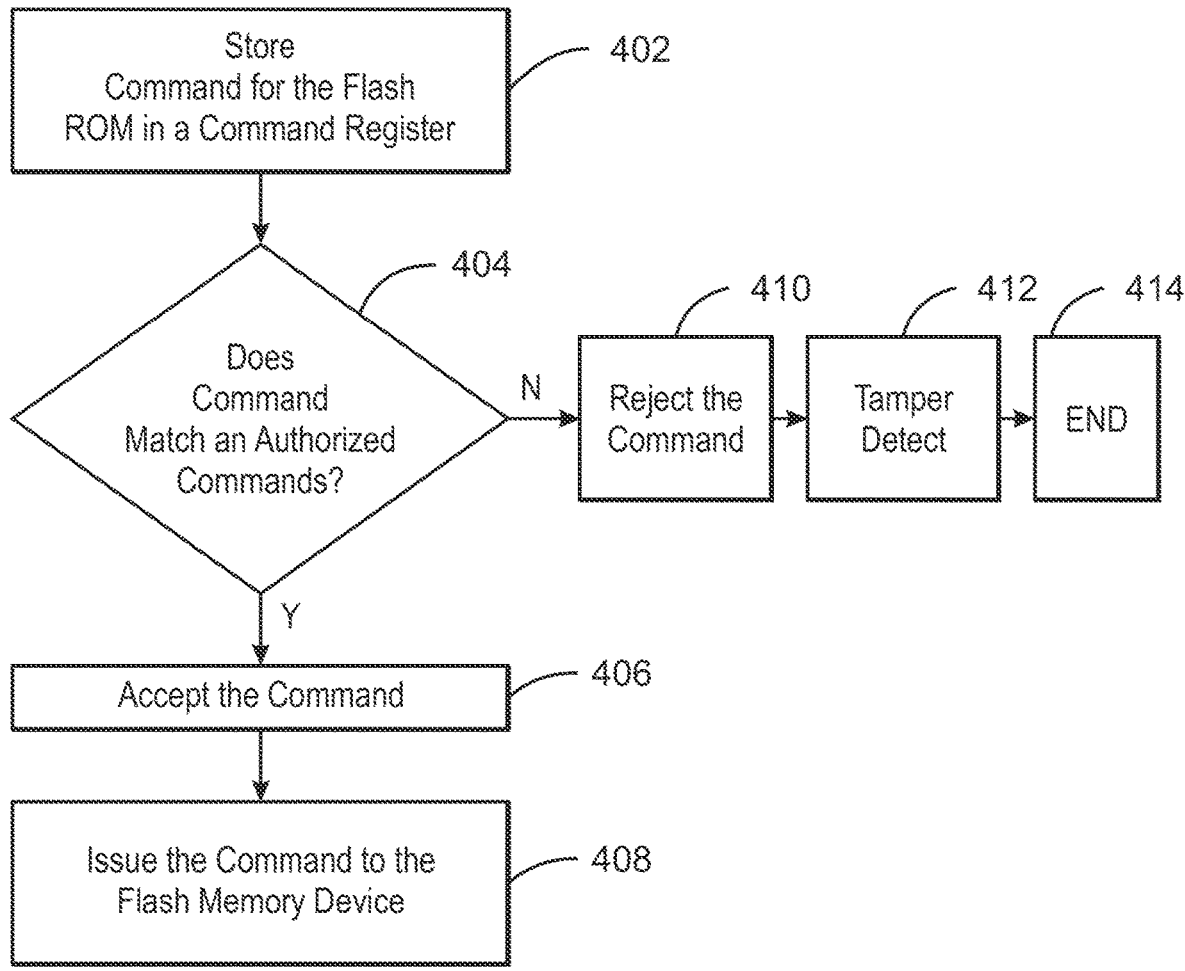
FIG. 4 is an example flow chart of operations related to accessing data on a flash memory device in accordance with the present disclosure.

FIG. 4 is an example flow chart 400 of operations related to accessing data on a flash memory device in accordance with the present disclosure. A list of authorized commands may limit unauthorized access and malicious attacks on the flash memory device. This list of authorized commands may populate registers, for example, in a BMC or other memory or disk controller. The registers may be locked to prevent modifications of the list of commands or their parameters.

At block 402, a command for the flash ROM may be sent to a flash controller, for example, being storing in a command register in the flash controller. In some examples, the command may be sent by malevolent or malfunctioning code and thus, may not be issued to the flash ROM. At block 404, a flash controller, BMC CPU, or other hardware, may determine whether the command in the command register matches an authorized command from the list of commands. This includes determining if the parameters for the command are in acceptable ranges. If there is a match, then at block 406, the flash controller may accept the command. The accepted command, at block 408, may be issued to the flash ROM.

If there is no match between the command and the list of commands at block 404, the flash controller may reject the command at block 410, as an illegal command. After rejecting the illegal command, the flash controller may provide a status to the CPU, a BMC CPU, or other units at block 412, by issuing a tamper detection notification. The tamper detection notification may include an error signal returned to a CPU, or may be a series of signals, such as an error signal to a CPU and a tamper detection alert to a BMC CPU, among others.

Further, tamper detection firmware may take corrective actions to address the unauthorized command. In some examples, an attempted unauthorized command may be logged in order to carry out analyses. The logged commands may be used to indicate faulty or malevolent code. After rejection, the method ends at block 414.

Figure 5:
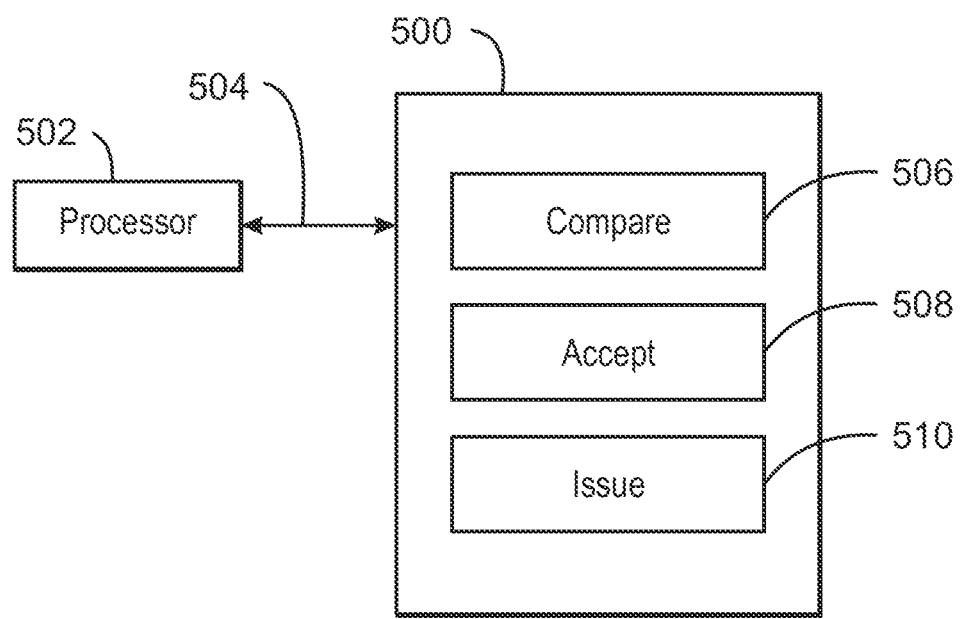
FIG. 5 is block diagram showing an example tangible, non-transitory, computer-readable medium that stores code configured to secure a flash memory device in accordance with the present disclosure.

FIG. 5 is block diagram showing an example tangible, non-transitory, computer-readable medium 500 that stores code configured to secure a flash memory device in accordance with the present disclosure. As described herein, this may be in a ROM associated with the BMC CPU. In some embodiments, the code is hard wired into logic circuits of a BMC or other ASIC, or a memory or disk controller. The computer-readable medium 500 may include the flash ROM 142 of FIG. 1. The computer-readable medium 500 may be accessed by a processor 502, such as a BMC CPU, over a computer bus 504 and may include code configured to perform the methods described herein.

The various components discussed herein may be implemented using the computer-readable medium 500. The components may include various modules to secure and protect the flash memory device from unauthorized access and malicious attacks. The compare module 506 may compare a command stored in a command register of a flash controller to a list of commands in registers or other memory locations. Any command transmitted to the flash ROM that does not match an authorized command in the registers may be rejected and, thus, not issue to the flash ROM. Conversely, the accept module 508 may accept any transmitted command that matches a command in the registers. Once a command is deemed authorized an issue module 510 may issue it to the flash memory device to be carried out.

The examples described herein may be susceptible to various modifications and alternative forms. It should be understood that the techniques are not intended to be limited to the particular examples disclosed herein. Indeed, the examples include all alternatives, modifications, and equivalents falling within the true spirit and scope of the appended claims.

What is claimed is:

1. A method for securing a memory device of a computing system, comprising:
    comparing a command for the memory device to a list of authorized commands for the memory device, wherein the list of authorized commands comprise a given authorized command, and the given authorized command is associated with a list of authorized parameters;
    comparing a parameter for the command for the memory device to a plurality of parameters in the list of authorized parameters, wherein comparing the parameter for the command for the memory device to the plurality of parameters comprises comparing a length of the command for the memory device to a command length parameter;
    accepting the command in response to the command matching the given authorized command in the list of commands and the parameter matching at least one parameter in the list of authorized parameters; and
    issuing the accepted command to the memory device.

2. The method of claim 1, wherein comparing the parameter for the command for the memory device to the plurality of parameters comprises comparing a data direction flow of the command for the memory device to a data direction parameter.

3. The method of claim 1, comprising locking the list of commands to prevent modifications.

4. The method of claim 1, comprising setting a write protect bit to lock the list of commands.

5. The method of claim 1, comprising rejecting the command for failing to match the authorized command in the list of commands.

6. A system for securing a memory device in a computing system, comprising:
    a flash controller coupled to the memory device; and
    registers coupled to the flash controller, wherein:
        a list of commands are located in the registers;
        a command comparator compares a command stored in a command register to each command in the list of commands to determine if the command is authorized;
        the command comparator identifies a match between a given command of the list of commands and the command stored in the command register;
        the given command of the command list is associated with a list of authorized parameters; and
        the command comparator compares a parameter for the command stored in the command register to a plurality of parameters in the list of authorized parameters, wherein the comparison by the command comparator comprises comparing a length of the command stored in the command register to a command length parameter; and
        a command acceptor identifies the command as authorized to the flash controller.

7. The system of claim 6, wherein the list of parameters associated with the given command comprises an address range, an attribute, a command length, or a combination thereof.

8. The system of claim 7, wherein the command comparator identifies the command stored in the command register as authorized in response to an address range for the command stored in the command register matching the address range for the command of the list of parameters associated with the given command, an attribute for the command stored in the command register matching the attribute of the command of the list of parameters associated with the given command, and the length of the command stored in the command register complying with the command length parameter.

9. The system of claim 6, wherein the flash controller is a module in a baseboard management controller (BMC).

10. The system of claim 6, wherein the flash controller issues a tamper detect notification if an unauthorized command is rejected.

11. The system of claim 6, wherein the list of commands is hard wired into logic circuits in an application specific integrated circuit (ASIC).

12. The system of claim 6, wherein the list of commands is loaded to the registers when a system boots.

13. The system of claim 6, wherein the flash controller allows direct access to the memory device during a boot sequence.

14. A non-transitory, computer-readable medium comprising instructions that, when executed by a processor, instruct the processor to:

compare a command stored in a command register to a list of authorized commands stored in registers in a baseboard management controller to identify a given authorized command in the list of authorized commands, wherein the given authorized command is associated with a list of authorized parameters;

compare a parameter for the command stored in the command register to a plurality of parameters in the list of authorized parameters, wherein comparing the parameter for the command stored in the command register comprises comparing a length of the command stored in the command register to a command length parameter;

accept the command stored in the command register based on the comparison of the parameter for the command stored in the command register with the plurality of parameters; and issue the accepted command to a memory device.

15. The non-transitory, computer-readable medium of claim 14, wherein the instructions instruct the processor to issue a tamper detect notification based on the comparison of the parameter for the command stored in the command register with the plurality of parameters.

* * * * *